Figure 1:
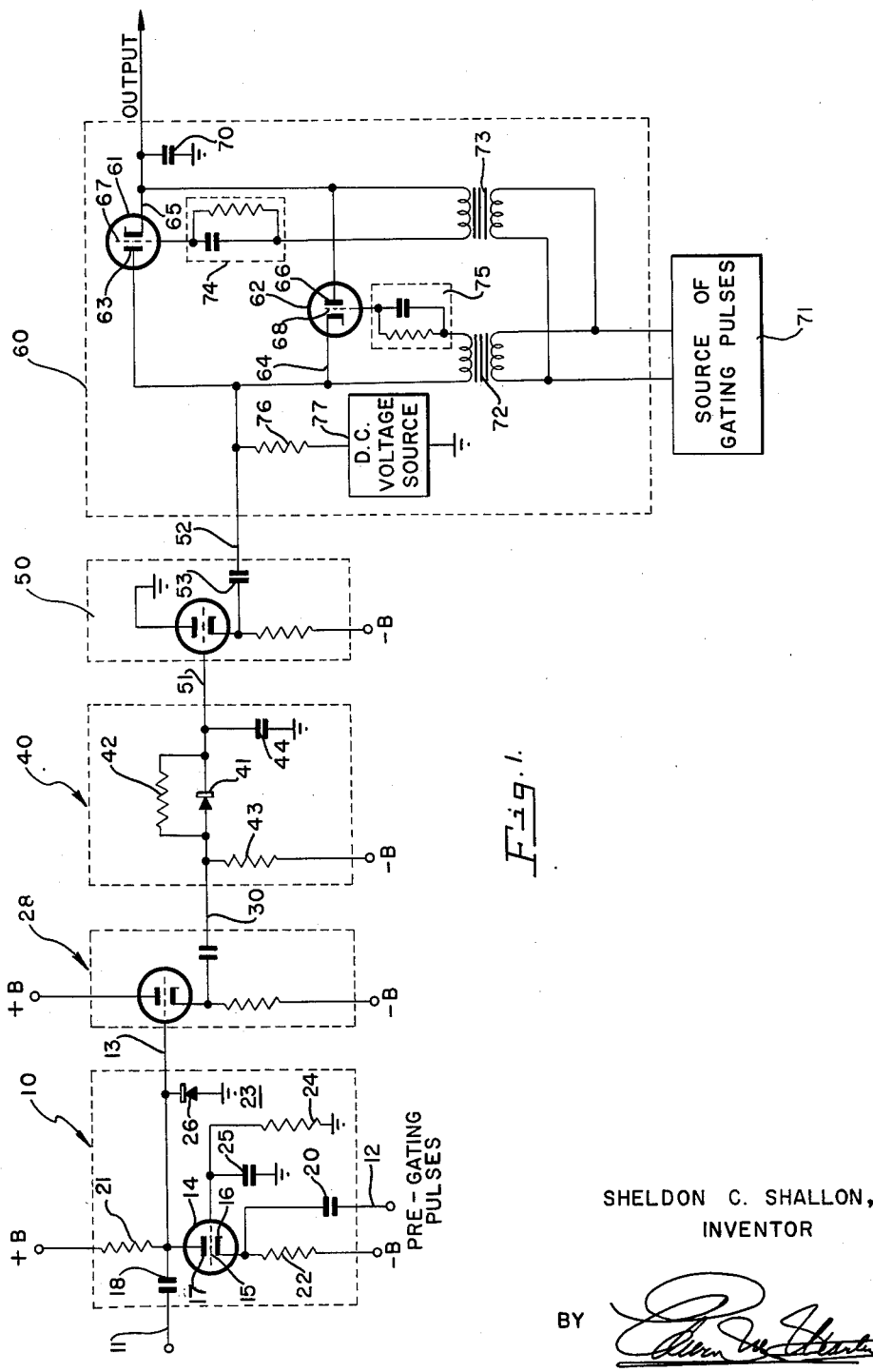

Dec. 19, 1961 — S. C. SHALLON — 3,014,182
TIME DISCRIMINATOR FOR USE IN RADAR OR THE LIKE
Filed Oct. 22, 1956 — 2 Sheets-Sheet 1

SHELDON C. SHALLON,
INVENTOR

BY
ATTORNEY

United States Patent Office 3,014,182
Patented Dec. 19, 1961

3,014,182
TIME DISCRIMINATOR FOR USE IN RADAR OR THE LIKE
Sheldon C. Shallon, Los Angeles, Calif., assignor to Hughes Aircraft Company, Culver City, Calif., a corporation of Delaware
Filed Oct. 22, 1956, Ser. No. 617,653
5 Claims. (Cl. 328—110)

The present invention relates generally to time discriminators, and particularly to a time discriminator for use in the range tracking circuit of a radar receiver.

Time discriminators are generally employed in radar range tracking circuits to produce an output signal which is a function of the time displacement between a received video signal, which may be an echo signal from a target in space, and a locally generated gating pulse. This output signal is frequently employed in automatic range tracking circuits to modify the time of generation of the local gating pulse in order to bring the gating pulse and the video signal into substantial time coincidence. While a number of circuits are known for performing the time discrimination function thus described, such circuits suffer from a number of deficiencies. For example, where the time discriminator includes gating circuits for receiving the video signal and the local gating pulse and is responsive to the amplitudes of the received signals to perform its gating function, noise or other interfering signals in time coincidence with the received video signal may contribute to the output signal produced by the discriminator. While such noise signals tend to be averaged in the output circuit of the gating circuit, the noise immunity of the discriminator is limited, and the output signal produced by the discriminator may be in error due to the noise signals present at the input of the discriminator.

Accordingly, it is an object of the present invention to provide a time discriminator circuit for use in a radar receiver which is relatively immune to noise signals in time coincidence with received video signals.

A further object of the present invention is to provide an improved time discriminator for use in radar receivers in which substantial noise immunity is achieved by applying a modified video signal, rather than the video signal itself, to the time discriminator.

Yet another object of the present invention is to provide a time discriminator for use in radar receivers that operates on modified video signals, which is simple, reliable and relatively immune to interfering noise signals.

A time discriminator, according to the present invention, comprises a pre-gate for gating received video signals to a pulse stretcher which operates on the selected signal to produce a stretched video signal of triangular waveform whose steeper portion is in substantial time coincidence with the received video signal, and a bilateral gate for receiving a gating pulse and the stretched video signal and producing an output signal which is a function of the time displacement between the gating signal and the center of the steeper portion of the triangular signal. The pulse stretcher circuit performs a noise averaging function which substantially reduces the effects of noise present at the input circuit of the time discriminator on the output signal produced.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only, and are not intended as a definition of the limits of the invention.

Figure 2:
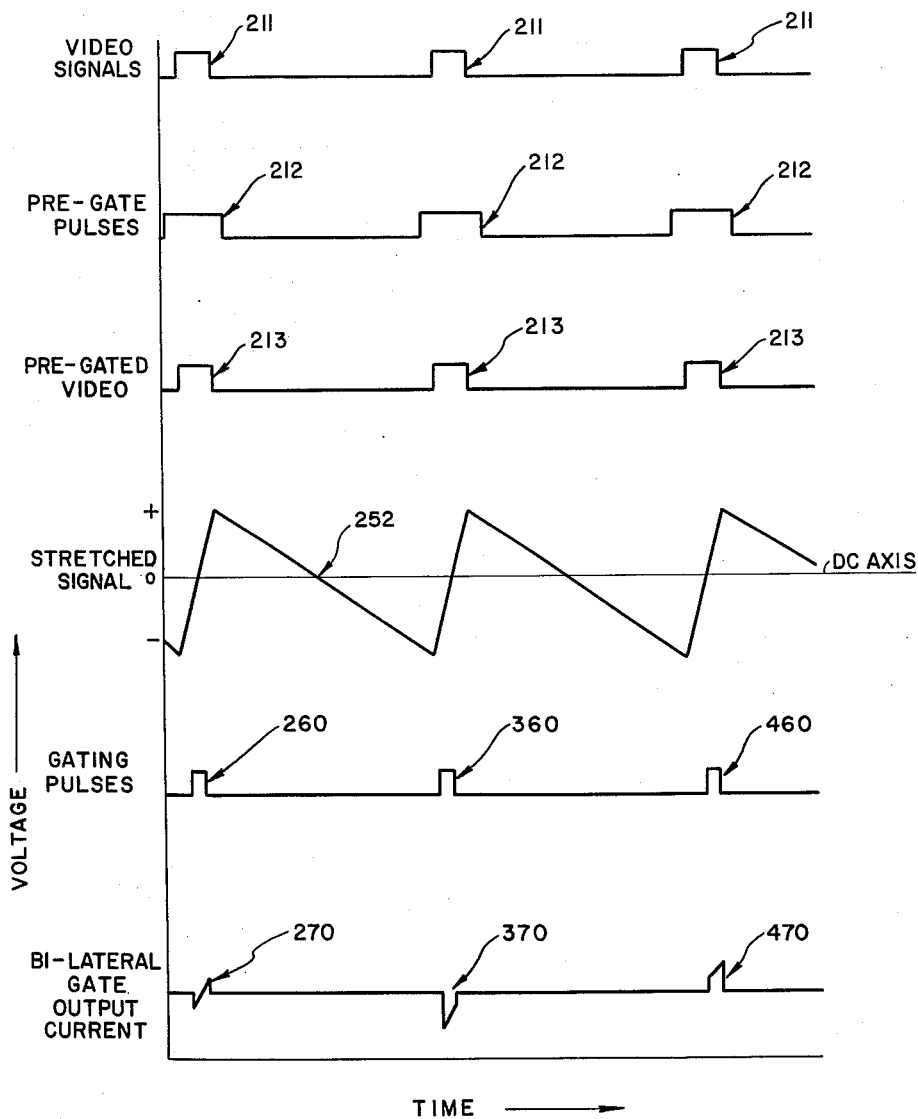

FIG. 1 is a circuit diagram of a time discriminator according to the present invention; and
FIG. 2 is a diagram of the waveforms of signals appearing at various points of the circuit of FIG. 1 in operation.

Referring now to the figures as shown in FIG. 1, a time discriminator according to the present invention comprises a pre-gate stage 10 for receiving video input signals on an input lead 11 and pre-gating pulses on an input lead 12 and producing output signals on an output lead 13 corresponding to the portions of the input signals applied to the lead 11 in time coincidence with the pre-gate pulse applied to the input lead 12. The pre-gating pulses may be supplied from any conventional type of pulse generator adapted to produce pulses having the necessary characteristics, to be described more fully hereinafter. As shown in the figure, the stage 10 comprises an electron discharge device 14 having a grid 15, a cathode 16 and an anode 17. The video input signals received by the stage 10 over the input lead 11 are coupled to the anode 17 of the tube 14 through a coupling capacitor 18, while the pre-gating pulses received over the input lead 12 are applied to the cathode 16 through a coupling capacitor 20. Operating potentials for the tube are supplied from a positive source of potential +B through a plate coupling resistor 21 connected to the anode 17 and from a negative source of supply −B which is coupled to the cathode 16 through a cathode coupling resistor 22. The grid 15 of the tube 14 is connected to ground by a grid coupling network 23, comprising a resistor 24 and a capacitor 25 connected in parallel. In addition, a diode 26 poled as shown interconnects the anode 17 and ground.

The potential of the positive source +B, the negative source −B, and the values of resistors 21 and 22 should be adjusted to provide that the tube 14 conducts in the absence of input pulses on the input leads 11 and 12, and is rendered non-conductive by the application of a positive pulse to the input lead 12. Under such conditions, the diode 26 will be biased to provide a short circuit to ground for signals applied to the anode 17 when the tube 14 is conducting and will be biased to appear as an open circuit for such signals when the tube 14 is cut off, thereby permitting the signals to appear on the output lead 13.

It will thus be seen that the stage 10 responds to input signals on leads 11 and 12 of positive polarity to produce output signals of positive polarity on the output lead 13 corresponding to the portions of the two input signals in time coincidence. These output signals are coupled to the pulse stretcher 40 through a conventional cathode follower stage 28 and, accordingly, appear on the input lead 30 of the pulse stretcher stage 40 as pulse signals of positive polarity. The pulse stretcher stage 40 comprises a diode 41 and a resistor 42 connected in parallel. One end of this parallel combination is connected to the input lead 30 and to a source of negative potential −B through a coupling resistor 43. The remaining end of the parallel diode-resistor circuit is connected to ground through a capacitor 44, the output signal appearing across the capacitor being the output signal of the pulse stretcher stage. The pulse stretcher 40 is responsive to the positive pulses applied to its input lead 30 to produce a triangular wave shape output signal across the capacitor 44. This signal is coupled to the input of a conventional cathode follower stage 50 by means of a lead 51 and appears as a signal of the same relative polarity on the output lead 52 of the stage, which in turn is connected to the input terminal of the bilateral gate 60. The output lead 52 embraces a capacitor 53 to provide A.C. coupling between the stages.

The bilateral gate 60 comprises a pair of triode electron discharge tubes 61 and 62, each having an anode, cathode and grid. The anode 63 of the tube 61 is connected to the cathode 64 of the tube 62 and functions as the input terminal to the bilateral gate 60. The cathode 65 of the tube 61 is connected to the anode 66 of the tube 62 and to ground through an integrator capacitor 70, the signal across the capacitor 70 comprising the output signal from the gate. Gating signals for the bilateral gate 60 are applied to the grid-cathode circuits of each of the tubes 61 and 62 from a source of gating pulses 71 through a pair of gating pulse transformers 72 and 73, which have their primaries connected in parallel to the gating pulse source 71 and one end of each of the secondaries connected to the grid 67 and the grid 68 of the tubes 61, 62, respectively, through a pair of grid coupling networks 74 and 75, respectively. The remaining ends of the secondaries of each of the transformers 72, 73 are connected to the cathodes 64, 65 of the tubes 62, 61 respectively. Each of the transformers 72, 73 is arranged to apply a positive pulse to the grid-cathode circuit of the respective tube to which it is coupled so as to render the tube conductive when a gating pulse is applied from the source 71 to the primary of each of the transformers. In addition, a D.C. level adjustment comprising a resistor 76 is connected to the input of the bilateral gate 60 and to an adjustable D.C. source 77.

The operation of the circuit thus described may be illustrated more fully by now considering FIG. 2, wherein there is shown diagrams of waveforms appearing at various points in the circuit of FIG. 1 in operation. For each of the waveforms, time is depicted as the abscissa, while amplitude is depicted as the ordinate. The operation depicted in FIG. 2 is considered to have been in progress for a number of cycles, so that transients asociated with the initial enabling of the circuit have died out. The video pulses applied to input lead 11 are depicted as waveform 211, while the gating pulses applied to input 12 are depicted as waveform 212. As shown in the figure, the pulses 212 will ordinarily be selected to have a duration longer than the duration of the video pulses 211 and, accordingly, the portions of the video pulses 211 in time coincidence with the pulses 212 will appear as positive pulses, depicted as waveform 213 on output lead 13. These pulses, when applied to input lead 30 of pulse stretcher 40, will cause capacitor 44, which was previously charging in a negative direction through resistors 42 and 43, to now discharge through the diode 41, thereby causing the signal appearing on the output lead 51, to rise to a relatively positive potential, whereupon at the termination of signal 213, charging of the capacitor in a negative direction will again be reinitiated. The resulting signal on the lead 51 for recurrent application of pulses to the input lead 30 will comprise a series of pulses of triangular waveform, the steeper portion of the waveform being in substantial time coincidence with the pulses 213. The signal on lead 51 will in turn be coupled to the input lead 52 of the bilateral gate 60 through the coupling capacitor 53 and, accordingly, the D.C. axis of the signal on lead 52, shown as waveform 252 will fall so as to place equal portions of the triangular waveform 252 above and below the axis. If a gating pulse, depicted as gating pulse 260 is in substantial time coincidence with the center of the portion of wave shape 252 having the greater slope, the positive portions of the wave shape 252 in time coincidence with the gating pulse 260 will be passed by the tube 61 to charge the capacitor 70 in a positive direction, while the negative portions of wave shape 252 in time coincidence with the pulse 260 will be passed by the tube 62, producing a current which will charge the capacitor 70 in a negative direction. If the time center of the gating pulse 260 occurs in substantial time coincidence with the passing of waveform 252 from a negative to a positive value (see FIG. 2), substantially equal positive and negative portions of the stretched video pulse will be passed to the capacitor 70 producing an output current signal 270 in the capacitor, and a corresponding voltage signal across the capacitor. It will be seen that under these conditions the net change of charge on capacitor 70 will be zero and no direct current output signal will be produced from the time discriminator.

If, on the other hand, the gating pulses 260 occur earlier in time than for the coincidence conditions described, as depicted for example, for gating pulse 360, the pulse will be in coincidence only with the negative portions of wave shape 252 and, accordingly, only tube 62 will pass current, thereby establishing a negative charge on capacitor 70 as depicted by current waveform 370. If the gating pulse occurs later in time, as shown for example for gating pulse 460, current will be passed by the tube 61, producing a net positive charge across the capacitor 70 due to the current flow depicted, for example, as waveform 470.

It will readily be recognized that the output signal from the bilateral gate 60 may be utilized in well-known circuits to shift the time of gating pulse generation by the source 71 to establish coincidence between the gating pulses and the stretched video output signal when the bilateral gate produces an output signal. Such a system would be arranged to cause the gate generator 71 to generate its gate later in time for negative polarities of output signal and earlier in time for positive polarities of output signal. The pre-gating pulses applied to input lead 12 should also be shifted a corresponding interval for such a mode of operation.

It will be noted that a zero output signal will be produced by the bilateral gate if the gating pulse is in substantial time coincidence with the crossover point for the longer trace of the triangular waveform 252. However, if there is the slightest degree of misalignment, such as would be present under normal operating conditions, the polarity of output signals when utilized in conjunction with a servo system properly poled will be such as to automatically servo the gating pulse into coincidence with the portion of the waveform 252 in substantial time coincidence with the input video pulse 211.

In operation, the D.C. level adjustment potentiometer 77 should be adjusted under no-signal-no-noise conditions. With an input signal applied utilizing a conventional range tracking servo-loop, automatic range tracking has been obtained for equivalent I.-F. input signal-to-noise ratios as low as −7 db, indicating relative freedom from noise effects. The use of A.C. coupling throughout the circuit of the present invention effectively eliminates tracking drifts due to changes in voltage level in the circuits.

While the embodiment shown in FIG. 1 utilizes vacuum tubes, a transistorized version of the circuit may be readily mechanized. The use of the present circuit, in conjunction with transistors, results in a circuit which is relatively immune to temperature and other variations in the characteristics of the transistors.

What is claimed is:
1. A time discriminator comprising: a gate responsive to video signals and pre-gating pulses for passing an output signal corresponding to the portions of said video signals in time coincidence with said pre-gating pulses; a pulse stretcher connected to said gate and responsive to the signals passed by said gate for producing a triangular wave whose steeper portion is in substantial time coincidence with the signals passed by said gate; means for developing a gating pulse; and a bilateral gate connected to be responsive to the signal produced by said pulse stretcher and to be responsive to said gating pulse for producing an output signal which is a function of the time displacement between said gating pulse and the center of the portion of said pulse stretcher output signal in time coincidence with the signals passed by said gate.

2. In a time discriminator, means responsive to video signals for producing a triangular wave shape output signal whose steeper portion is in substantial time coincidence with said video signals, means for developing a gating pulse, and a bilateral gate coupled to said first and second named means and responsive to said triangular signal and a gating pulse for producing an output signal which is a function of the time displacement between said gating pulse and the center of said steeper portion of said triangular wave shape.

3. A time discriminator that is substantially unresponsive to noise types of interfering signals and comprising: a gate responsive to video signals and a pregating pulse signal in substantial time coincidence therewith and having a time duration greater than that of video signals to be tracked, said gate being responsive to said signals for passing portions of said signals in time coincidence; a video pulse stretcher coupled to said gate and responsive to the signals passed by said gate for producing a triangular wave shape output signal whose steeper portion is in substantial time coincidence with the signals passed by said gate; means for developing a gating pulse; and a bilateral gate coupled to said pulse stretcher and to said means and responsive to said triangular wave shape output signal and said gating pulse for producing an output signal which is a function of the relative timing between said gating pulse and said triangular wave shape output signal.

4. In a time discriminator, a pulse stretcher responsive to video signals and producing a stretched video signal having a substantially triangular waveform whose steeper portion is in substantial time coincidence with said video signal; and a bilateral gate including first and second triode electron discharge devices, each having an anode, cathode and grid; means interconnecting the anode of said first electron discharge device and the cathode of said second electron discharge device to form an input terminal for said bilateral gate; means interconnecting the cathode of said first electron discharge device and the anode of said second electron discharge device to form an output terminal for said bilateral gate; means for simultaneously applying a gating pulse to the grid-cathode circuits of each of said first and second triode electron discharge devices; and means for applying said stretched video signal to the input terminal of said bilateral gate, the output terminal of said bilateral gate serving as the output terminal for said time discriminator.

5. A time discriminator comprising: a gate responsive to video signals and pre-gating pulses and passing an output signal corresponding to the portions of said video signals in time coincidence with said pre-gating pulses; a pulse stretcher connected to said gate and responsive to the signals passed by said gate for producing a stretched video signal whose steeper portion is in substantial time coincidence with the signals passed by said gate; means for developing a gating pulse; and a bilateral gate connected to receive the signal produced by said pulse stretcher and said gating pulse and being responsive to said received signals for producing an output signal which is a function of the time displacement between said gating signal and the center of the portion of said pulse stretcher output signal in time coincidence with the signals passed by said gate.

References Cited in the file of this patent

UNITED STATES PATENTS

| | | |
|---|---|---|
| 2,760,189 | McCoy | Aug. 21, 1956 |
| 2,761,130 | Kibler | Aug. 28, 1956 |
| 2,807,015 | Shank | Sept. 17, 1957 |
| 2,866,893 | Minneman | Dec. 30, 1958 |